US006525777B2

United States Patent
Kameda et al.

(10) Patent No.: US 6,525,777 B2
(45) Date of Patent: Feb. 25, 2003

(54) VIDEO SIGNAL PROCESSOR PROCESSING VIDEO SIGNAL BY PLURALITY OF DATA DRIVEN PROCESSORS AND TELEVISION RECEIVER USING THE SAME

(75) Inventors: Takeshi Kameda, Tenri (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/326,648

(22) Filed: Jun. 7, 1999

(65) Prior Publication Data

US 2003/0011710 A1 Jan. 16, 2003

(30) Foreign Application Priority Data

Jun. 19, 1998 (JP) .......................................... 10-173132

(51) Int. Cl.⁷ ................................................. H04N 5/46
(52) U.S. Cl. ........................ 348/555; 348/721; 348/725
(58) Field of Search ................................ 348/554, 555, 348/556, 558, 720, 721, 725, 553; H04N 5/46

(56) References Cited

U.S. PATENT DOCUMENTS

| 5,264,931 A | 11/1993 | Yamada |
| 5,267,024 A | 11/1993 | Murayama |
| 5,404,539 A | 4/1995 | Onozaki |
| 5,452,464 A | 9/1995 | Nomura et al. |
| 5,475,442 A | 12/1995 | Matsushita et al. |
| 5,483,661 A | 1/1996 | Yoshida et al. |
| 5,577,256 A | 11/1996 | Muramatsu et al. |
| 5,586,281 A | 12/1996 | Miyama et al. |
| 5,590,355 A | 12/1996 | Shichiku et al. |
| 5,630,151 A | 5/1997 | Muramatsu et al. |
| 5,640,525 A | 6/1997 | Yumoto et al. |
| 5,652,906 A | 7/1997 | Kadosumi et al. |
| 5,748,933 A | 5/1998 | Amagai et al. |
| 5,761,737 A | 6/1998 | Kadosumi et al. |
| 5,794,064 A | 8/1998 | Yoshida et al. |
| 5,794,065 A | 8/1998 | Hatakeyama et al. |
| 5,812,806 A | 9/1998 | Muramatsu et al. |
| 5,848,290 A | 12/1998 | Yoshida et al. |
| 5,860,019 A | 1/1999 | Yumoto |
| 5,870,620 A | 2/1999 | Kadosumi et al. |
| 5,872,991 A | 2/1999 | Okamata et al. |
| 5,918,063 A | 6/1999 | Miyama et al. |
| 5,956,517 A | 9/1999 | Okamoto et al. |

FOREIGN PATENT DOCUMENTS

| EP | 0 777 382 A2 | 6/1997 |
| JP | 4120978 | 4/1992 |
| JP | 9247573 | 9/1997 |
| WO | 96/00478 | 1/1996 |

Primary Examiner—Michael H. Lee
(74) Attorney, Agent, or Firm—Birch, Stewart, Kolasch & Birch, LLP (57) ABSTRACT

A video signal processor includes a receiver unit receiving a broadcasted wave, an identify unit identifying a broadcasting system according to a signal received by the receiver unit, and a plurality of data driven processors processing a video signal received by the receiver unit according to the broadcasting system identified by the identify unit. Since the plurality of data driven processors process a video signal received by the receiver unit according to the broadcasting system identified by the identify unit, video data corresponding to the broadcasting system can be generated.

16 Claims, 8 Drawing Sheets

VIDEO SIGNAL PROCESSOR PROCESSING VIDEO SIGNAL BY PLURALITY OF DATA DRIVEN PROCESSORS AND TELEVISION RECEIVER USING THE SAME

BACKGROUND OF THE INVENTION

1. Field of the Invention

The present invention relates to video signal processors corresponding to a plurality of broadcasting systems and television receivers using the same. Particularly, the present invention relates to a video signal processor utilizing the characteristic of a data driven processor, and a television receiver using such a video signal processor.

2. Description of the Background Art

These several years have seen the spread of a television receiver that realizes video signal processing by converting a video signal into a digital signal and processing this digital signal. This digital signal process requires a processing performance of considerably high speed. Furthermore, signal processing of high complexity is required in accordance with the higher picture quality in clear-vision broadcasting and high-vision broadcasting.

The structure of the apparatus accommodating digital broadcasting will become more versatile as the services for practical application of digital broadcasting begins to be provided. More specifically, not only video signals, but also computer-oriented data and the like will be received through digital broadcasting. A television receiver incorporated with the function of a computer, a set-top box used in connection with an a receiver directed to analog broadcasting, an extended board incorporating only the processing function of a received video signal and the like are envisaged.

The digital television broadcasting in U.S.A. includes a plurality of image formats differing in the scanning system (interlace scanning, non interlace scanning), number of scanning lines, number of pixels, aspect ratio, and the like. The structure of a television receiver per se directed to the television broadcasting has also become versatile.

Figure 1:
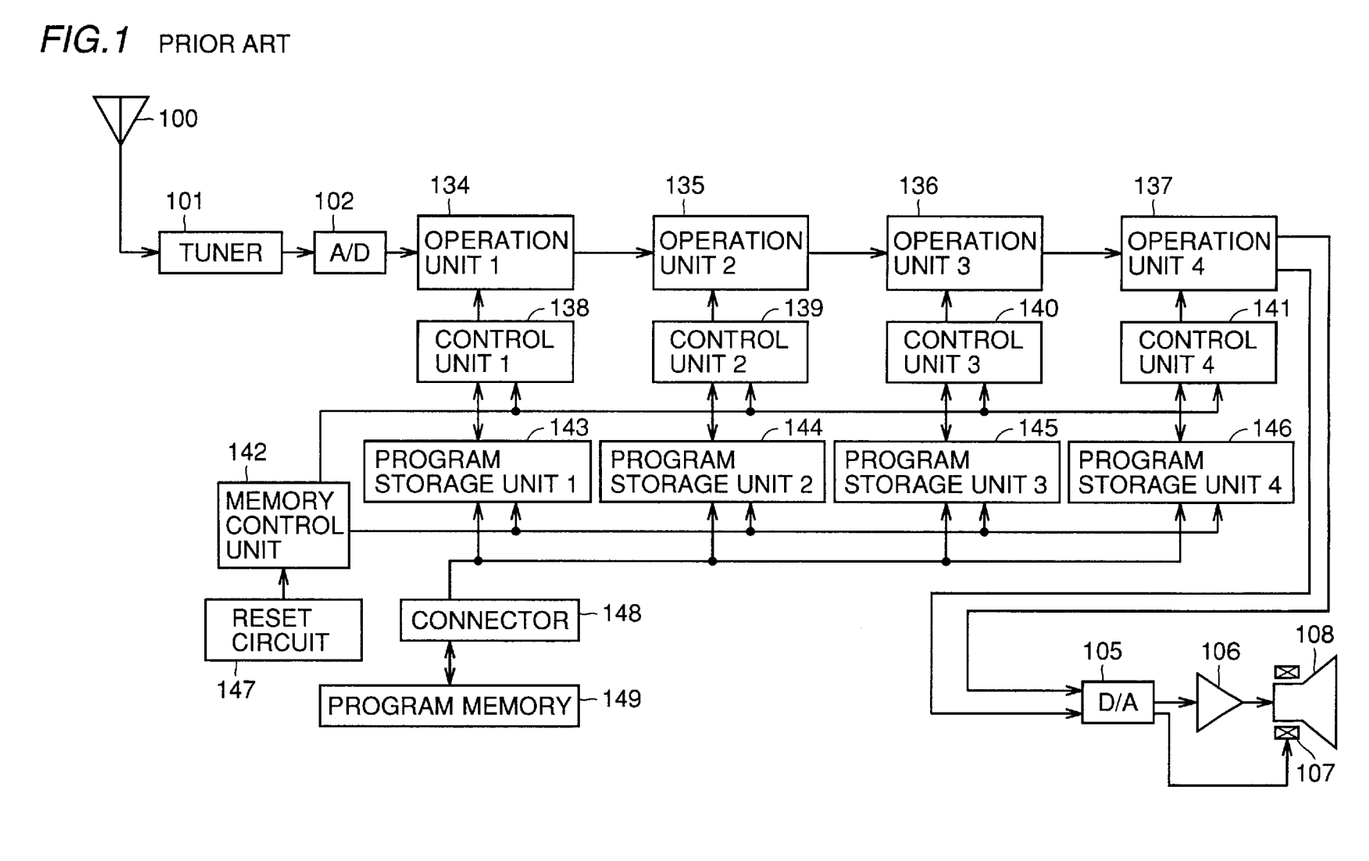
FIG. 1 is a block diagram showing a schematic structure of a conventional television receiver incorporating a DSP.

Research is in progress to accommodate the variety of broadcasting systems by incorporating a DSP (Digital Signal Processor) in a television receiver and altering the software of the DSP. FIG. 1 shows a schematic structure of a television receiver incorporating a DSP disclosed in Japanese Patent Laying-Open No. 4-120978. The television receiver includes an antenna 100, a tuner 101, an A/D (Analog/Digital) converter 102, a D/A (Digital/Analog) converter 105, a drive circuit 106, a deflection coil 107, a CRT (Cathode Ray Tube) 108, operation units 1–4 (134–137), control units 1–4 (138–141), a memory control unit 142, program storage units 1–4 (143–146), a reset circuit 147, a connector 148 and a program memory 149. One DSP is formed of an operation unit i (i=1–4) and a control unit i (i=1–4).

After being reset by reset circuit 147, memory control unit 142 reads out a program executed by each DSP from program memory 149 via connector 148 to load that program to program storage units 1–4 (143–146).

The broadcasting wave received by antenna 100 is channel-tuned by tuner 101, whereby a desired channel signal is received. Tuner 101 provides the video detection signal extracted from the channel signal to A/D converter 102. A/D converter 102 converts the video detection output from tuner 101 into a digital signal. The digital signal is provided to operation unit 1 (134). According to the program loaded in program storage unit 1 (143) under control of control unit 1 (138), operation unit 1 (134) sequentially applies an operation on the video detection output converted into a digital signal from A/D converter 102 for output.

Similarly, sequential operation is carried out in operation units 2–4 (135–137). The video data output from operation unit 4 (137) is applied to D/A converter 105. D/A converter 105 converts the video signal into an analog signal to provide the video to CRT 108 via drive circuit 106. Operation unit 4 (137) generates at the same time a synchronizing signal applied to deflection coil 107. This synchronizing signal is converted into an analog signal by D/A converter 105 to be applied to deflection coil 107 as a deflection pulse.

The invention disclosed in Japanese Patent Laying-Open No. 9-247573 relates to a television receiver that processes a video signal by a plurality of operation elements arranged in an array.

Since a great amount of operation is required in video signal processing, the video signal must be processed in parallel by a plurality of DSPs as in the invention disclosed in Japanese Patent Laying-Open No. 4-120978 or by a plurality of operation elements as in the invention disclosed in Japanese Patent Laying-Open No. 9-247573. By such a structure, a television receiver accommodating a variety of broadcasting systems can be realized with a common hardware.

However, the number of DSPs or the operation elements must be altered when the specification of the television receiver itself is to be changed, such as in the case of modifying the hardware structure to suit the load of video signal processing. Furthermore, it is necessary to significantly alter the design of the hardware structure to load a microprogram or the design of the microprogram per se in accordance with change in the number of DSPs or the operation elements. Therefore, there was a problem that the object of accommodating a variety of broadcasting systems with a common hardware could not be achieved.

SUMMARY OF THE INVENTION

An object of the present invention is to provide a video signal processor that can accommodate a variety of broadcasting systems by just a simple hardware modification.

Another object of the present invention is to provide a video signal processor that can automatically identify the broadcasting system to generate and output video corresponding to that broadcasting system.

A further object of the present invention is to provide a television receiver that can accommodate a variety of broadcasting systems by just a simple hardware modification.

Still another object of the present invention is to provide a television receiver that can automatically identify the broadcasting system to generate and output video corresponding to that broadcasting system.

According to an aspect of the present invention, a video signal processor includes a receiver unit receiving a broadcasted wave, an identify unit identifying the broadcasting system according to a signal received by the receiver unit, and a plurality of data driven processors processing a video signal received by the receiver unit according to the broadcasting system identified by the identify unit.

Since the plurality of data driven processors process a video signal received by the receiver unit according to the broadcasting system identified by the identify unit, video data corresponding to the identified broadcasting system can be generated.

According to another aspect of the present invention, a video signal processor includes a receiver unit receiving a broadcasted wave, a detachable external storage unit storing a microprogram processing a video signal corresponding to a broadcasting system, and a plurality of data driven processors reading out and executing the microprogram stored in the external storage unit.

Since the plurality of data driven processors can read out and execute the microprogram from a detachable external storage unit, the user can view video at the desired broadcasting system by selecting and loading an external storage unit.

According to a further aspect of the present invention, a television receiver includes a receiver unit receiving a broadcasted wave, an identify unit identifying a broadcasting system according to the signal received by the receiver unit, a plurality of data driven processors processing a video signal received by the receiver unit according to the broadcasting system identified by the identify unit, and a display unit providing a display of a video signal processed by the plurality of data driven processors.

Since the plurality of data driven processors process a video signal received by the receiver unit according to the broadcasting system identified by the identify unit, video data corresponding to a broadcasting system can be generated.

According to still another aspect of the present invention, a television receiver includes a receiver unit receiving a broadcasted wave, a detachable external storage unit storing a microprogram processing a video signal corresponding to a broadcasting system, a plurality of data driven processors reading out and executing the microprogram stored in the external storage unit, and a display unit providing a display of a video signal processed by the plurality of data driven processors.

Since the plurality of data driven processors read out and execute a microprogram from a detachable external storage unit, the user can view video in a desired broadcasting system by selecting and loading an external storage unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 2:
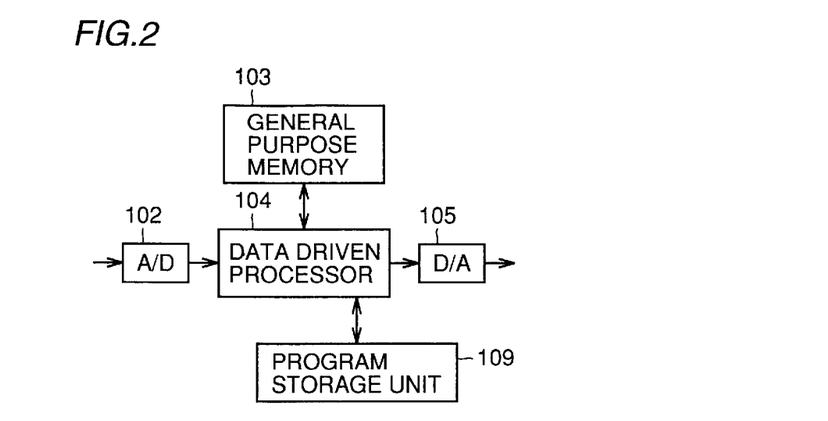
FIG. 2 is a block diagram showing a schematic structure of a video signal processor according to a first embodiment of the present invention.

FIG. 2 is a block diagram schematically showing a video signal processor according to a first embodiment of the present invention. The video signal processor includes an A/D converter 102 to convert an analog video signal into a digital signal, a general purpose memory 103 to temporarily store video data, a data driven processor 104, a D/A converter 105 converting the video signal generated by data driven processor 104 into an analog signal, and a program storage unit 109 storing a microprogram executed by data driven processor 104. A microprogram corresponding to each broadcasting system is stored in program storage unit 109.

Figure 3:
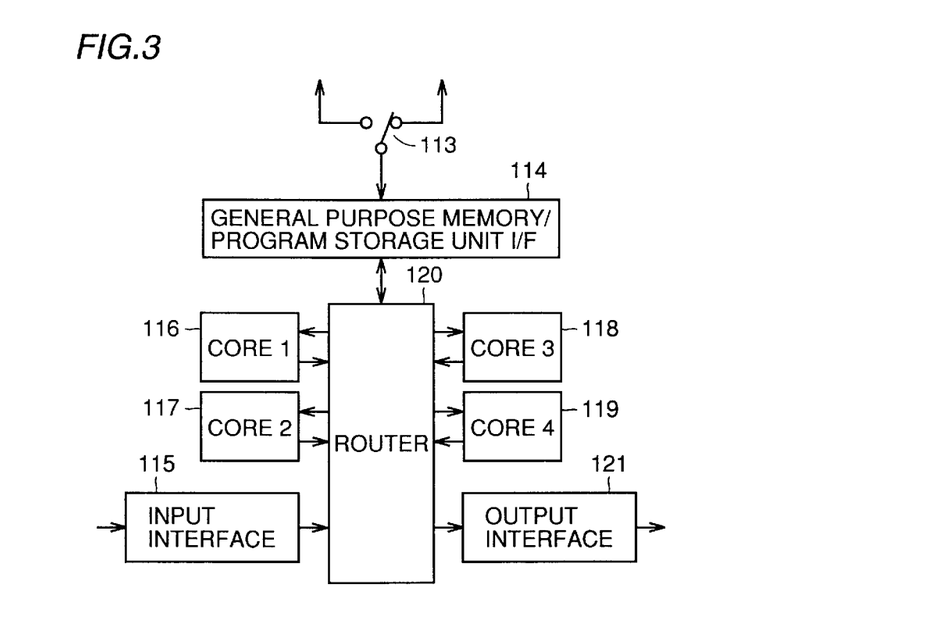
FIG. 3 is a block diagram to describe in further detail a data driven processor 104.

FIG. 3 is a block diagram showing a schematic structure of data driven processor 104. Data driven processor 104 includes a switch unit 113 to switch the connection between the bus of general purpose memory 103 and program storage unit 109, a general purpose memory/program storage unit I/F (interface) 114 to input a packet from general purpose memory 103 or program storage unit 109 via switch unit 113, an input interface 115 converting externally applied data into a packet for output, operation cores 1–4 (116–119) carrying out an arithmetic operation or a logic operation, a router 120 exchanging a packet generated by input interface 115 with a packet generated by each of operation cores 1–4 (116–119), and an output interface 121 generating data from the packet to be provided outside.

Input interface 115 converts the input data into a packet of the internal data format of data driven processor 104. This packet includes information of the type of operation applied on relevant data and the destination of the data in addition to the general data.

Router 120 inputs a packet converted by input interface 115 to provide the packet to operation cores 1–4 (116–119) according to the destination information. Router 120 is capable of exchanging a packet with each of operation cores 1–4 (116–119) simultaneously at the maximum transfer rate. Even in the case where the packet transfer from operation core 1 (116) to operation core 2 (117) and the packet transfer from operation core 3 (118) to operation core 4 (119), for example, are carried out at the same time, respective packets can be transferred at the maximum transfer rate. Router 120 also includes the function of providing a packet that is input via general purpose memory/program storage unit I/F 114, and the function of transmitting the packet to general purpose memory/program storage unit I/F 114 to be written into general purpose memory 103 or program storage unit 109. Router 120 can exchange a packet at the maximum transfer rate even with respect to a packet input via general purpose memory/program storage unit I/F 114.

Each of operation cores 1–4 (116–119) extracts the data and the type of operation from the input packet to apply an operation on the relevant data. If the packet including the other data for operation is not yet input at the current stage, queing is effected until the packet is input. Upon completion of the internal operation, operation cores 1–4 (116–119)

modify the packet destination information to the destination of the operation core that is to receive the data subjected to the operation and outputs the packet including the data subjected to the operation. When the modified destination information points to itself, the same operation core will input the packet again. The present invention is not limited to the four operation cores shown in FIG. 3. The operation processing performance on the video signal can be improved by increasing the number of operation cores.

When the input packet destination information points to an other data driven processor connected to the current data driven processor 104, output interface 121 provides that packet to the external data driven processor. Thus, the data in the packet is subjected to an operation in the operation core designated by the destination information and then output as a packet again, whereby video data is sequentially generated from the video signal. It is assumed that output interface 121 provides output data in the desirable packet format or data format (the format of providing only the data outside without storing the data in a packet).

Figure 4:
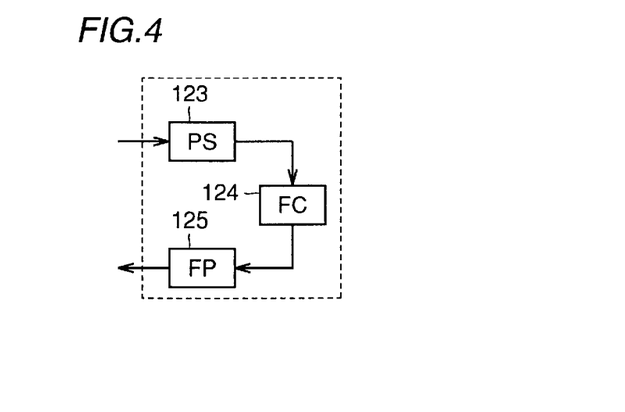
FIG. 4 is a block diagram to describe in further detail operation cores 1–4 (116–149).

Referring to the block diagram of FIG. 4, each of operation cores 1–4 (116–119) includes a program storage unit (referred to as PS hereinafter) 123 temporarily storing a program, a firing control unit (referred to as FC hereinafter) 124 to effect queing until the data for an operation is available, and an operation unit (referred to as FP hereinafter) carrying out an arithmetic operation or a logic operation.

PS 123 temporarily stores a processing procedure (microprogram) for a packet. The microprogram is input in the aforementioned packet format even when loaded into PS 123. More specifically, the destination information of the operation core into which the microprogram is to be loaded is written in the destination information of the packet including the microprogram. The relevant packet is output from input interface 115. By specifying the destination information within the program stored in microprogram storage unit 109, the microprogram is loaded autonomously into PS 123 of interest.

When an operation is to be applied on the data in the packet, FC 124 effects queing until a packet including the other data is input. The two packets, when available, are output to FP 125. Upon the output of two packets from FC 124, FP 125 carries out an arithmetic operation or a logic operation on the data in the relevant packets. The operated result is stored in the packet again and the destination information added as described above. Then this packet is output to router 120.

According to the video signal processor of the present embodiment, the operation processing performance on a video signal can be improved by processing the video signal using a data driven processor. A video signal corresponding to a broadcasting system can be processed.

Second Embodiment

Figure 5:
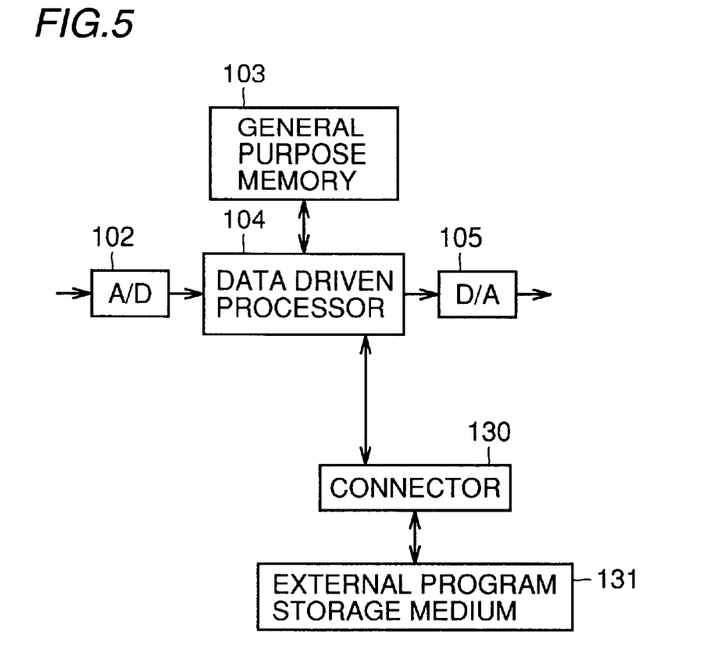
FIGS. 5 and 6 are block diagrams showing a schematic structure of a video signal processor according to a second embodiment and a third embodiment, respectively, of the present invention.

FIG. 5 is a block diagram showing a schematic structure of a video signal processor according to a second embodiment of the present invention. The video signal processor of the second embodiment differs from the video signal processor of the first embodiment shown in FIG. 2 in that a connector 130 and an external program storage medium 131 are provided instead of program storage unit 109. Therefore, detailed description of likewise components and function will not be repeated.

Router 120 in data driven processor 104 reads in a packet via switch unit 113 and general purpose memory/program storage unit I/F 114 to output a packet according to the destination information. Therefore, the microprogram stored in external program storage medium 131 is loaded autonomously as described previously. An IC (integrated circuit card), a ROM (Read Only Memory) cassette and the like are used for external program storage medium 131.

According to the present embodiment, a microprogram is supplied by an external program storage medium. Therefore, a video signal processor corresponding to an arbitrary broadcasting system can be provided with the same hardware structure.

Third Embodiment

Figure 6:
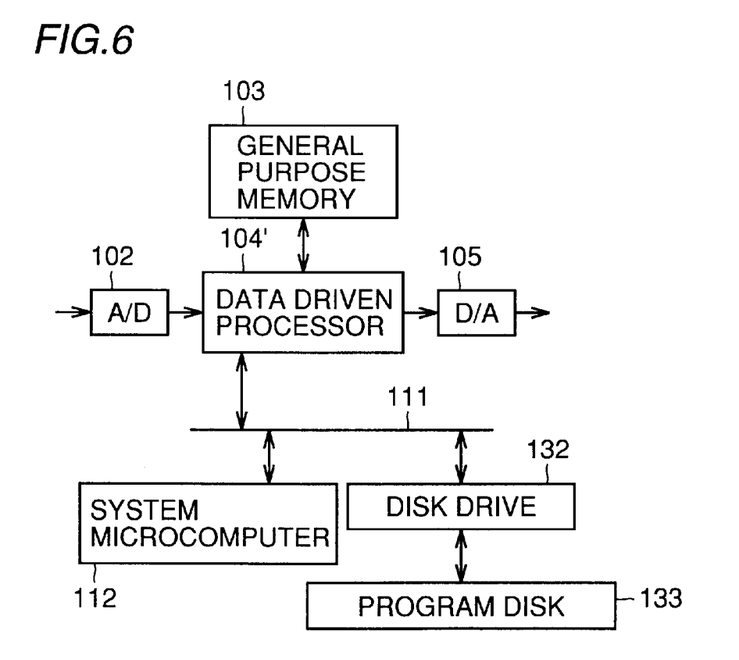

FIG. 6 is a block diagram showing a schematic structure of a video signal processor according to a third embodiment of the present invention. The video signal processor of the third embodiment differs from the video signal processor of the first embodiment shown in FIG. 2 in that a system microcomputer 112 and a disk drive 132 into which a program disk 133 is loaded are provided instead of program storage unit 109. Detailed description of likewise components and function will not be repeated.

System microcomputer 112 reads in a packet from program disk 133 via a system microcomputer bus 111 and disk drive 132. The packet read in is supplied to a data driven processor 104' via system microcomputer bus 111.

Figure 7:
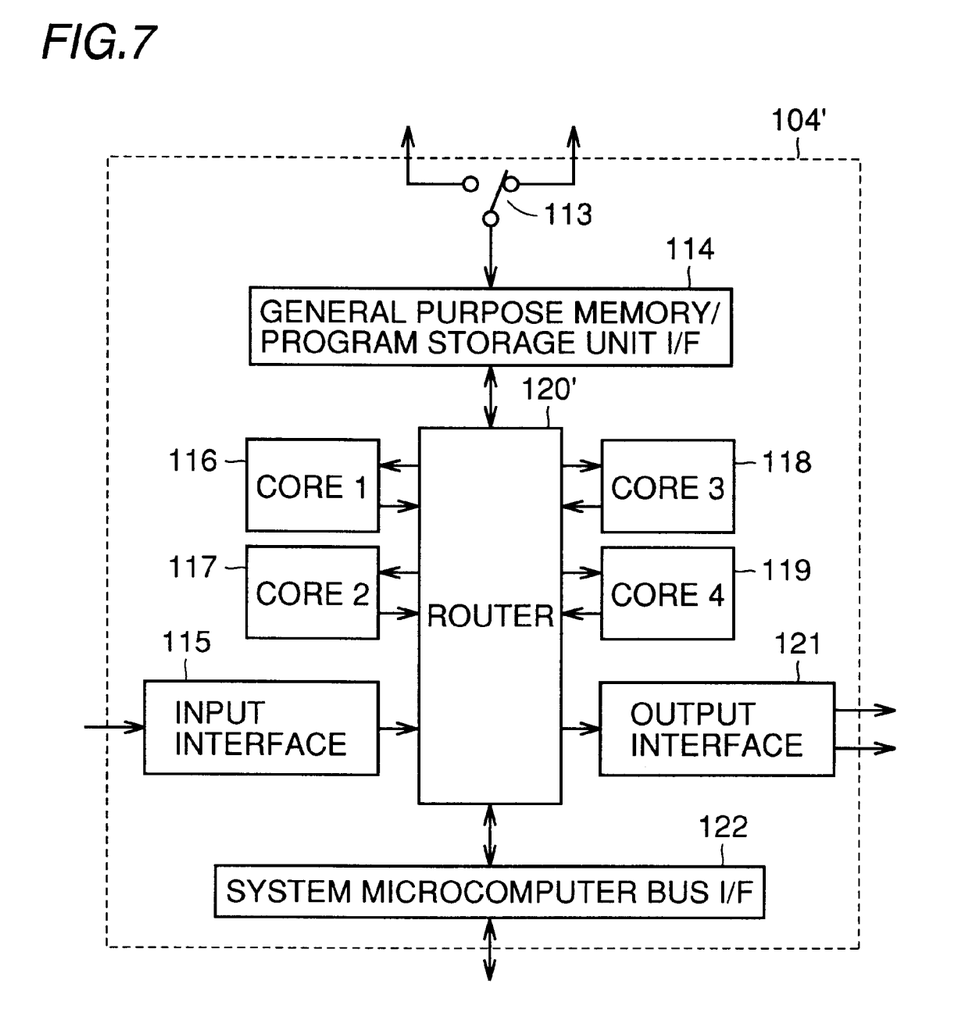
FIG. 7 is a block diagram to describe in further detail a data driven processor 104'.

FIG. 7 is a block diagram showing a schematic structure of data driven processor 104' of the present embodiment. Data driven processor 104' of the present embodiment differs from data driven processor 104 of the first embodiment shown in FIG. 2 in that a system microcomputer bus I/F 122 is added and that the function of router 120 differs. Therefore, detailed description of likewise components and function will not be repeated. In the present embodiment, router will be described with the reference numeral of 120'.

System microcomputer bus I/F 122 receives the packet output from system microcomputer 112 via system microcomputer bus 111 and provides the input packet to router 120'. Router 120' reads in the packet via system microcomputer bus 122 to output the packet according to the destination information. Therefore, the microprogram stored in program disk 133 is autonomously loaded as described previously. A floppy disk, a CD-ROM and the like are used for program disk 133.

According to the video signal processor of the present embodiment, a microprogram is supplied by a program disk. Therefore, a video signal processor corresponding to an arbitrary broadcasting format can be provided with the same hardware structure.

Fourth Embodiment

Figure 8:
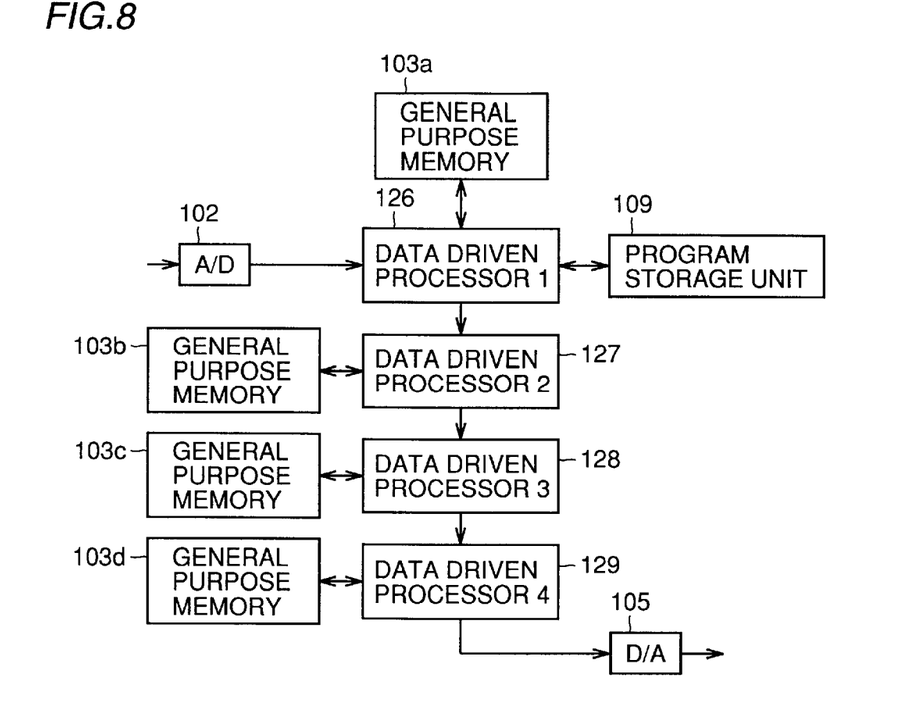
FIG. 8 is a block diagram showing a schematic structure of a video signal processor according to a fourth embodiment of the present invention.

FIG. 8 is a block diagram showing a schematic structure of a video signal processor according to a fourth embodiment of the present invention. The video signal processor of the fourth embodiment differs from the video signal processor of the first embodiment shown in FIG. 2 in that a plurality of data driven processors 1–4 (126–129) are provided instead of data driven processor 104, and that general purpose memories 103a–103d connected to respective data driven processors are added. Therefore, detailed description of likewise components and functions will not be repeated.

As described above, data transmission and reception between data driven processors are carried out in the packet format. In the case where the amount of operation to process a video signal increases to necessitate the install of an additional data driven processor, the operation processing capability of the entire video signal processor can be improved by simply connecting the data driven processor. The microprogram read out from program storage unit 109 is transmitted to the data driven processor corresponding to the destination information even when a plurality of data driven processors are used. Therefore, the program loading mechanism is identical to that of only one data driven processor as shown in FIG. 2. Therefore, program storage unit 109 is to be connected only to data driven processor 1 (126).

According to the present embodiment, a video signal processor is provided that can accommodate a variety of broadcasting systems by a simple modification of the hardware.

Fifth Embodiment

Figure 9:
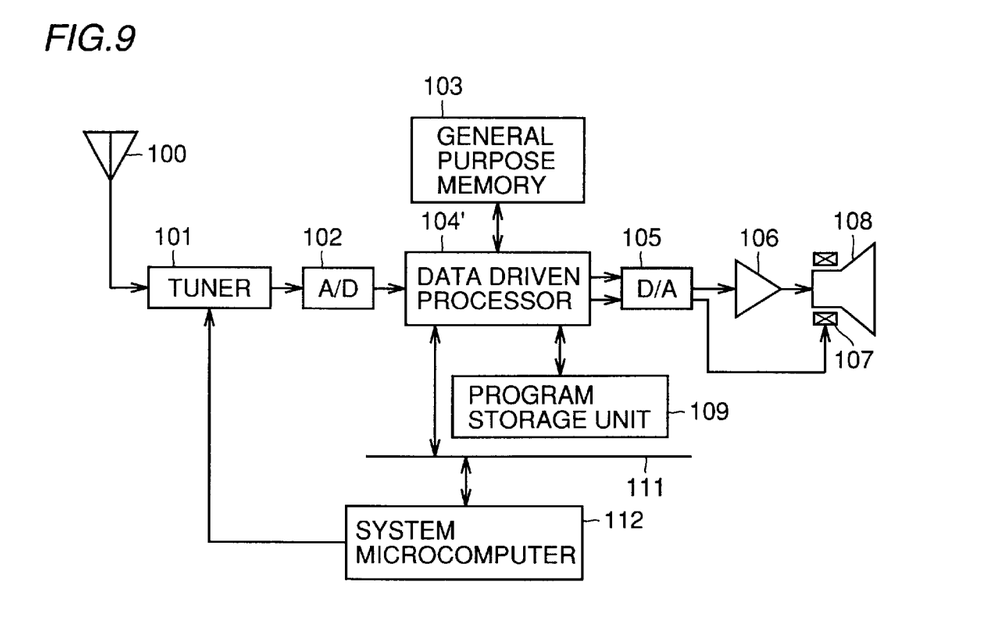
FIG. 9 is a block diagram showing a schematic structure of a television receiver according to a fifth embodiment of the present invention.

FIG. 9 shows a schematic structure of a television receiver according to a fifth embodiment of the present invention. The television receiver employs the video signal processor of the first embodiment shown in FIG. 2, and further includes an antenna 100, a tuner 101, a drive circuit 106, a deflection coil 107, a CRT 108, and a system microcomputer 112. It is to be noted that two types of digital signals are output from output interface 121 in data driven processor 104, i.e., a digital signal for a video signal and a digital signal for controlling deflection coil 107. Detailed description of the components and function similar to those of the video signal processor of the first embodiment shown in FIG. 2 will not be repeated.

The broadcasted wave received via antenna 100 is channel-tuned by tuner 101, whereby a desired channel signal is received. Tuner 101 provides a video detection signal extracted from the channel signal to A/D converter 102. A/D converter 102 converts the video detection output from tuner 101 into a digital signal. The digital signal is provided to data driven processor 104.

Data driven processor 104 carries out various processes such as synchronization deflection processing, Y/C separation, luminance processing, chrominance processing, and matrix conversion. These processes are carried out by data driven processor 104 loading and executing the microprogram stored in program storage unit 109. D/A converter 105 converts the color signal and the luminance signal generated by data driven processor 104 into analog signals for output. The video signal converted into an analog signal is displayed on CRT 108 via driver circuit 106. The synchronizing signal generated by data driven processor 104 is converted into an analog signal by D/A converter 105 to be applied to deflection coil 107.

System microcomputer 112 provides the system control of the entire television receiver. For example, the selected channel specified by remote control is designated to tuner 101, data driven processor 104 initialized, loading of a microprogram initiated, and the constant during a process (the numeric required in generating video data) modified.

Figure 10:
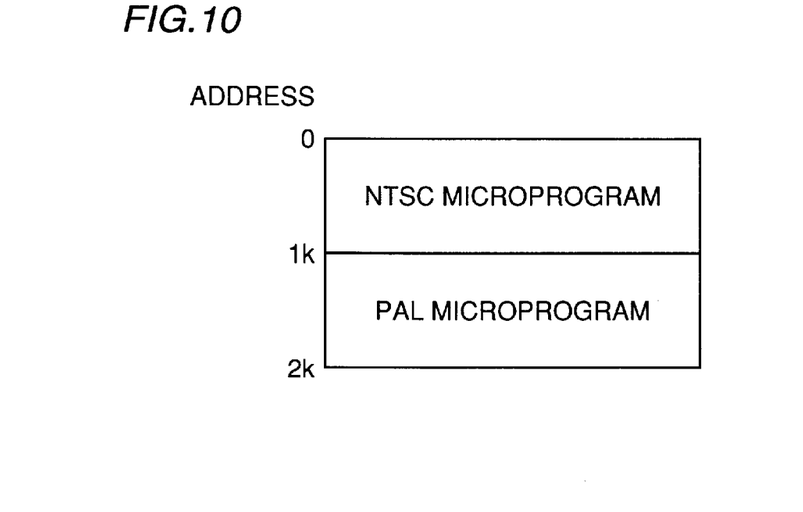
FIG. 10 shows an example of the contents of a program storage unit 109.

FIG. 10 shows an example of the contents of program storage unit 109. Referring to FIG. 10, a microprogram corresponding to the NTSC (National Television System Committee) system is stored at the first 1k-byte region. In the subsequent 1k-byte region, a microprogram corresponding to the PAL (Phase Alternation by Line) system is stored. A method of identifying these two systems will be described hereinafter.

A vertical synchronizing (referred to as "vsync" hereinafter) signal and a horizontal synchronizing (referred to as "hsync" hereinafter) signal are output in addition to the video signal from tuner 101. Data driven processor 104 counts one cycle of this vsync signal, i.e., the number of hsync signals (line numbers) in one field. Identification between the NTSC broadcasting system and the PAL broadcasting system can be made since the number of lines within one field differ therebetween. Furthermore, it is possible to identify between an interlace system or a non-interlace system depending upon the timing of the hsync signal with respect to the vsync signal. By identifying the number and timing of the synchronizing signals, a broadcasting system other than the NTSC system and the PAL system can be identified.

Data driven processor 104 can process a video signal and a synchronizing signal corresponding to a broadcasting system automatically by loading and executing a microprogram corresponding to the identified result of the broadcasting system from program storage unit 109.

According to the television receiver of the present embodiment, the operation processing capability on a video signal and the like can be improved by processing the video signal, the synchronizing signal, and the like using a data driven processor. Video signal processing corresponding to a broadcasting system is allowed. Furthermore, the television receiver can identify the broadcasting system and automatically select and execute a process corresponding to the identified broadcasting system. Therefore, a television receiver superior in operability can be provided.

Sixth Embodiment

Figure 11:
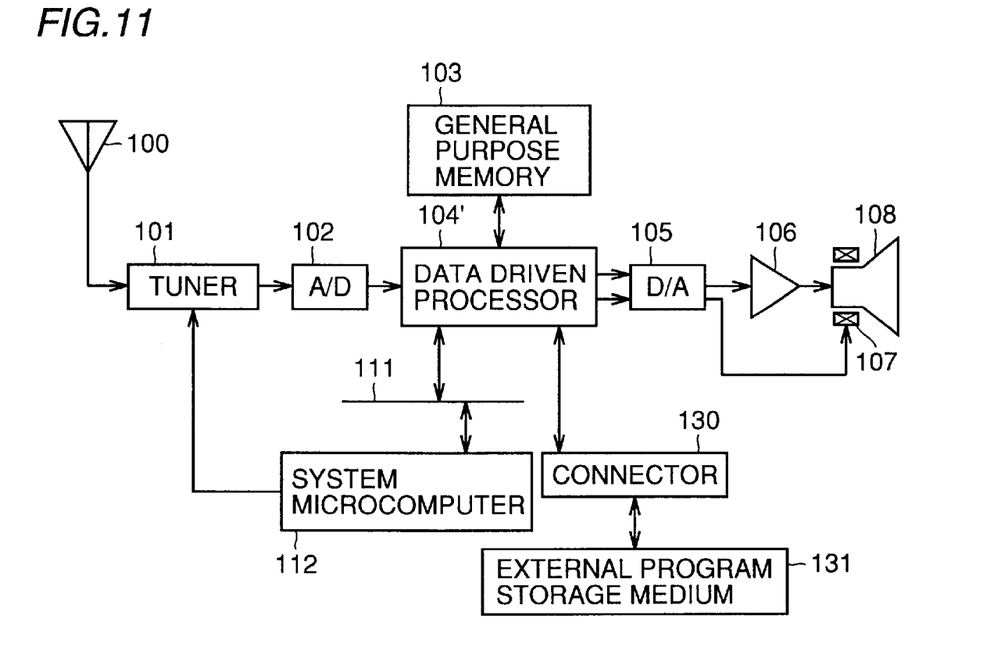
FIGS. 11, 12 and 13 are block diagrams showing a schematic structure of a television receiver according to a sixth embodiment, a seventh embodiment and an eighth embodiment, respectively, of the present invention.

FIG. 11 is a block diagram showing a schematic structure of a television receiver according to a sixth embodiment of the present invention. The television receiver of the sixth embodiment differs from the television receiver of the fifth embodiment shown in FIG. 9 in that a connector 130 and an external program storage medium 131 are provided instead of program storage unit 109. Therefore, detailed description of likewise components and functions will not be repeated.

Router 120 in data driven processor 104 reads in a packet via switch unit 113 and general purpose memory/program storage unit I/F 114 to output the packet according to the destination information. Therefore, the microprogram stored in external program storage medium 131 is autonomously loaded as described before. An IC card, a ROM cassette and the like are used for external program storage medium 131.

According to the television receiver of the present embodiment, a microprogram is supplied by an external program storage medium. Therefore, a television receiver corresponding to an arbitrary broadcasting system can be provided with the same hardware structure.

Seventh Embodiment

Figure 12:
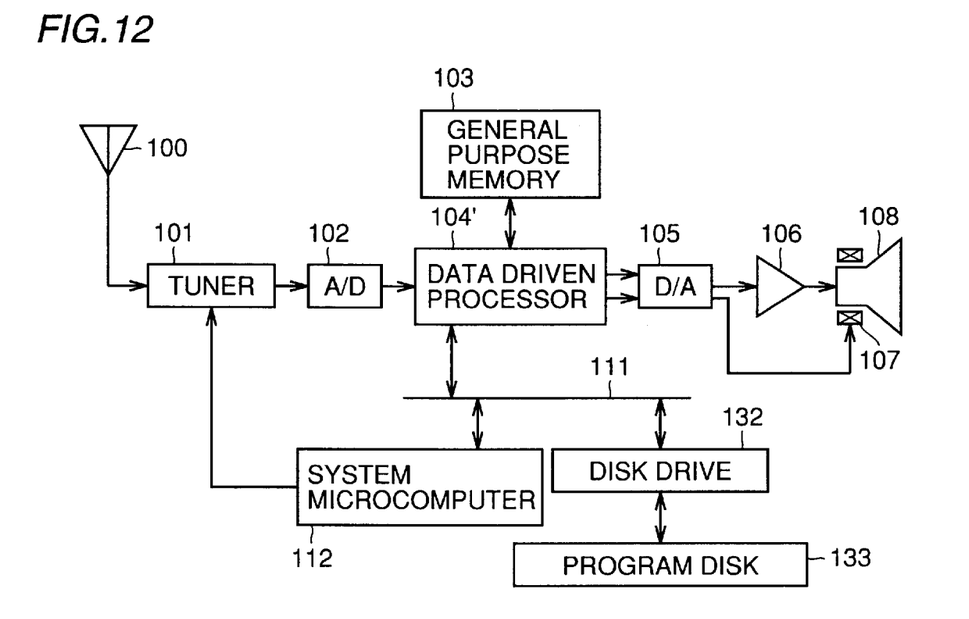

FIG. 12 is a block diagram showing a schematic structure of a television receiver according to a seventh embodiment of the present invention. The television receiver of the seventh embodiment differs from the video signal processor of the fifth embodiment shown in FIG. 9 in that a disk drive 132 in which a program disk 133 is loaded is provided instead of program storage unit 109. Therefore, detailed description of likewise components and functions will not be repeated.

System microcomputer 112 reads in a packet from program disk 133 via system microcomputer bus 111 and disk drive 132. The packet read in is supplied to data driven processor 104' (refer to FIG. 7) via system microcomputer bus 111. A floppy disk, a CD-ROM and the like are used for program disk 133.

According to the television receiver of the present embodiment, a microprogram is supplied by a program disk. Therefore, a television receiver corresponding to an arbitrary broadcasting format can be provided with the same hardware structure.

Eighth Embodiment

Figure 13:
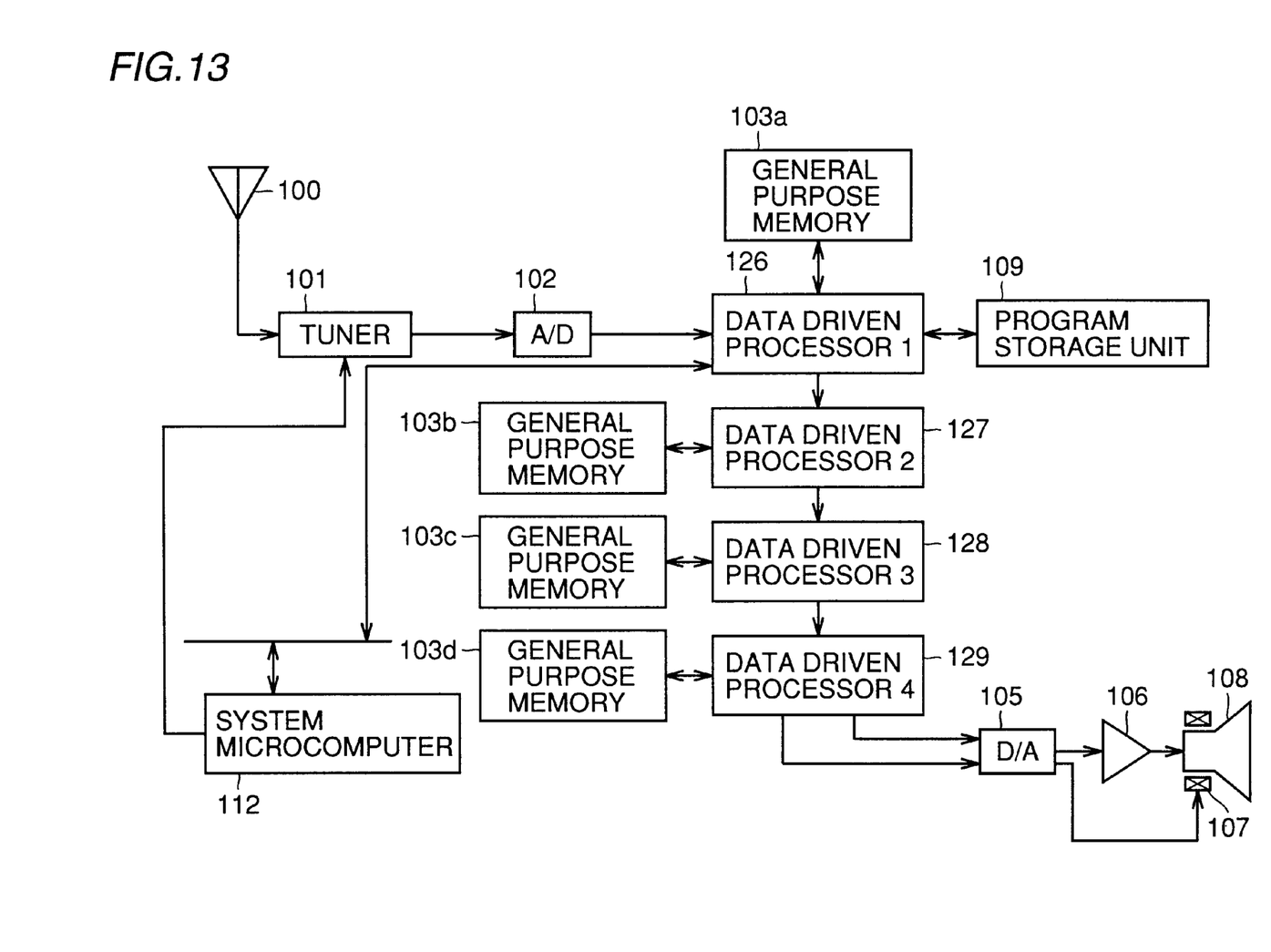

FIG. 13 is block diagram showing a schematic structure of a television receiver according to an eighth embodiment of the present invention. The television receiver of the eighth embodiment differs from the television receiver of the fifth embodiment shown in FIG. 9 in that a plurality of data driven processors 1–4 (126–129) are provided instead of data driven processor 104, and that general purpose memories 103a–103d are additionally connected to respective data driven processors. Therefore, detailed description of likewise components and functions will not be repeated.

According to the television receiver of the present embodiment, a television receiver accommodating a variety of broadcasting systems can be provided by a simple modification of the hardware.

Although a television receiver is taken as an example of the apparatus using the video signal processor of the first to fourth embodiments in the fifth to eighth embodiments, a liquid crystal panel or a PDP (plasma display panel) can also be employed. Also, although a signal output from a tuner has been described mainly as a video signal, a reproduced video signal of a VTR (video tape recorder), a video CD (compact disk), a DVD (digital video disk) and the like can also be input and processed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal processor comprising:
   a receiver unit receiving a broadcasted wave,
   an identify unit identifying a broadcasting system according to a signal received by said receiver unit, and
   a plurality of data driven processors processing a video signal received by said receiver unit according to the broadcasting system identified by said identify unit, wherein the data driven processors process the video signal based on information contained in the video signal including at least one of the type of operations to be performed and the destination of data within the plurality of data driven processors.

2. The video signal processor according to claim 1, further comprising a read unit reading out a microprogram executed by said plurality of data driven processors, and supplying the read microprogram to said plurality of data driven processors.

3. The video signal processor according to claim 1, further comprising a storage unit storing a microprogram processing a video signal corresponding to a plurality of broadcasting systems,
   wherein said plurality of data driven processors read out and execute from said storage unit a microprogram corresponding to the broadcasting system identified by said identify unit.

4. The video signal processor according to claim 1, wherein said identify unit extracts a synchronizing signal from the signal received by said receiver unit to identify said broadcasting system according to said synchronizing signal.

5. The video signal processor according to claim 4, wherein said identify unit extracts a vertical synchronizing signal and a horizontal synchronizing signal from the signal received by said receiver unit, and detects the number of pulses of said horizontal synchronizing signal in a vertical synchronizing period to identify said broadcasting system.

6. The video signal processor according to claim 1, further comprising a video storage unit retaining video information,
   wherein said plurality of data driven processors temporarily retain in said video storage unit video information obtained by processing said video signal.

7. A video signal processor comprising:
   a receiver unit receiving a broadcasted wave,
   a detachable external storage unit storing a microprogram processing a video signal corresponding to a broadcasting system, and
   a plurality of data driven processors reading out and executing the microprogram stored in said external storage unit, wherein the data driven processors process the video signal based on information contained in the video signal including at least one of the type of operations to be performed and the destination of data within the plurality of data driven processors.

8. The video signal processor according to claim 7, further comprising a video storage unit retaining video information,
   wherein said plurality of data driven processors temporarily retain in said video storage unit video information obtained by processing said video signal.

9. A television receiver comprising:
   a receiver unit receiving a broadcasted wave,
   an identify unit identifying a broadcasting system according to a signal received by said receiver unit,
   a plurality of data driven processors processing a video signal received by said receiver unit according to the broadcasting system identified by said identify unit, wherein the data driven processors process the video signal based on information contained in the video signal including at least one of the type of operations to be performed and the destination of data within the plurality of data driven processors, and
   a display unit displaying the video signal processed by said plurality of data driven processors.

10. The television receiver according to claim 9, further comprising a read unit reading out a microprogram executed by said plurality of data driven processors, and supplying the read microprogram to said plurality of data driven processors.

11. The television receiver according to claim 9, further comprising a storage unit storing a microprogram processing a video signal corresponding to a plurality of broadcasting systems,
   wherein said plurality of data driven processors read out and execute from said storage unit a microprogram corresponding to the broadcasting system identified by said identify unit.

12. The television receiver according to claim 9, wherein said identify unit extracts a synchronizing signal from the signal received by said receiver unit to identify said broadcasting system according to said synchronizing signal.

13. The television receiver according to claim 12, wherein said identify unit extracts a vertical synchronizing signal and a horizontal synchronizing signal from the signal received by said receiver unit, and detects the number of pulses of said horizontal synchronizing signal in a vertical synchronizing period to identify said broadcasting system.

14. The television receiver according to claim 9, further comprising a video storage unit retaining video information, wherein said plurality of data driven processors temporarily retain in said video storage unit video information obtained by processing said video signal.

15. A television receiver comprising:

a receiver unit receiving a broadcasted wave, a detachable external storage unit storing a microprogram processing a video signal corresponding to a broadcasting system, a plurality of data driven processors reading out and executing the microprogram stored in said external storage unit, wherein the data driven processors process the video signal based on information contained in the video signal including at least one of the type of operations to be performed and the destination of data within the plurality of data driven processors, and a display unit displaying the video signal processed by said plurality of data driven processors.

16. The television receiver according to claim 15, further comprising a video storage unit retaining video information, wherein said plurality of data driven processors temporarily retain in said video storage unit video information obtained by processing said video signal.

* * * * *